United States Patent [19]
Sawyers et al.

[11] Patent Number: 5,408,863
[45] Date of Patent: Apr. 25, 1995

[54] KNOCK DETECTOR FOR INTERNAL COMBUSTION ENGINE

[75] Inventors: James H. Sawyers, Santa Ana; Gerald A. Thompson, Yorba Linda; Wayne Helander, Arcadia, all of Calif.

[73] Assignee: Hughes Aircraft Company, Los Angeles, Calif.

[21] Appl. No.: 48,100

[22] Filed: Apr. 15, 1993

[51] Int. Cl.$^6$ ............................................. G01L 23/22
[52] U.S. Cl. ....................................................... 73/35
[58] Field of Search .............. 73/35 R, 35 KR, 35 K, 73/35 KS, 35 I, 35 M, 35 O, 35 P

[56] References Cited

U.S. PATENT DOCUMENTS

| | | | |
|---|---|---|---|
| 4,334,422 | 6/1982 | Kawai et al. | 73/35 |
| 4,356,551 | 10/1982 | Iwase et al. | 73/35 K X |
| 4,777,920 | 10/1988 | Oshiage et al. | 123/425 |
| 5,109,820 | 5/1992 | Iwara et al. | 123/425 |
| 5,115,779 | 5/1992 | Itoyama | 73/35 K X |

*Primary Examiner*—Richard E. Chilcot, Jr.
*Assistant Examiner*—Joseph L. Felber
*Attorney, Agent, or Firm*—W. K. Denson-Low

[57] ABSTRACT

An engine knock detector including a first mechanism for sensing engine noise during a first time period of an engine combustion cycle and providing a first signal in response thereto. A second mechanism is also provided for sensing engine noise and engine knock during a second time period of the combustion cycle and providing a second signal in response thereto. Finally, a third mechanism is included for comparing the first and second signals and generating a third signal to determine the occurrence of an engine knock. In a preferred embodiment, a vibration signal represented by an electrical voltage is bandpass amplified, digitized and filtered by a tunable filter. The filtered digital signal, which represents engine vibrations, is then directed to first and second energy detectors. The coefficients of the tunable filter and the timing signals of the energy detectors are provided by a programmable memory. Each energy detector respectively provides an energy signal which represents the total energy within one of two separate regions within a single combustion cycle. The two separate regions represent a no-knock time duration and a knock time duration of the combustion cycle. The two energy signals are then subjected to a hypothesis test within a comparator to determine the occurrence of an engine knock.

12 Claims, 2 Drawing Sheets

KNOCK DETECTOR FOR INTERNAL COMBUSTION ENGINE

BACKGROUND OF THE INVENTION

1. Field of the Invention

The present invention relates to engine knock detection. More specifically, the present invention relates to methods and apparatus for digital knock detection in internal combustion engines.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

2. Description of the Related Art

Engine knock detection and control systems are employed to improve the performance of internal combustion engines. The engine knock phenomenon is manifested as a chaotic disturbance that occurs during the combustion cycle in which burning of the fuel/air mixture proceeds in a violent unstable manner. The violent burning of the fuel/air mixture is typically accompanied by combustion chamber shock wave formation and resultant high amplitude pressure perturbations. The perturbations of combustion chamber pressure occur during the fuel burning stage and after the occurrence of spark ignition.

The high amplitude pressure perturbations can produce annoying audible "knock" noise that is very distinguishable at low engine RPMs. At higher engine RPMs, the knock can be disguised by other engine noises. The knock phenomenon is characterized by amplitude fluctuations of the combustion chamber pressure which generally exceed one bar peak-to-peak and occurs at acoustic vibration frequencies within the range of (4-12) kHz.

When knock detection and control is ineffective, damage to the engine can occur in the presence of heavy knock. Additionally, ineffective knock detection results in false alarm rates and missed detections at lower knock levels. A false alarm is an inadvertent adjustment to the spark ignition control circuitry intended to compensate for a perceived knock event that did not actually occur. A missed detection is the failure of a knock detector to discern an actual knock event which generates a combustion chamber pressure exceeding one bar peak-to-peak amplitude. Further, the knock phenomenon results in less than optimum fuel burning, loss of combustion efficiency and an increase in engine emission levels.

In contrast to the knock event is a no-knock event. The no-knock event is manifested as a slight disturbance that occurs during the burning of the fuel/air mixture of the combustion cycle. The burning of the fuel/air mixture is accompanied by low amplitude combustion chamber pressure perturbations. The no-knock phenomenon is characterized by slight amplitude fluctuations of the combustion chamber pressure occurring at acoustic vibration frequencies within the range of (4-12) kHz and which do not exceed one bar peak-to-peak amplitude.

The knock and no-knock events within an internal combustion engine are also characterized by knock sensor vibration signature patterns. The vibration signature patterns of knock and no-knock events are distinguishable from one another. Typically, the vibration signature patterns of knock and no-knock events are analyzed to assist in designing a knock detector. A knock detector is employed to detect the knock phenomenon and to provide a signal to an engine control module to adjust, for example, the spark ignition mechanism. Changes in the engine noise level within an internal combustion engine are utilized to detect a knock event. The vibration signature patterns of knock and no-knock events can be analyzed utilizing a time-frequency analyzer. The time-frequency analyzer generates plots of vibration amplitude versus time and frequency which exhibit stochastic or quasi-repetitive patterns due to the variable conditions existing within the combustion chamber.

The objective in utilizing a knock detector is to eliminate the knock events within an internal combustion engine as they are annoying and may potentially cause engine damage. Contemporary American and foreign automobiles provide engine knock detection by means of electronic circuitry which continually processes signals from one or more sensors mounted on the engine block or head. The sensor is a transducer that converts mechanical vibration to an electrical signal. The electrical signal is directed to a filter to limit the sensor output signals to the (4–12) kHz range of interest. Based upon empirical evidence, a signal threshold level is established. If the filtered sensor output signal exceeds the threshold level, a knock event is deemed to have occurred. The detection of the knock event, results in an automatic adjustment to the ignition timing within the engine distributor. By adjusting the ignition timing, the probability of a subsequent knock event occurring is greatly reduced as is known in the art. However, the ignition timing adjustment affects all cylinders without regard to which cylinder was actually the source of the knock event. The vibration sensor is sensitive to spurious noises in addition to actual knock events resulting in unnecessary ignition timing adjustments (e.g., false alarms).

Several recent approaches incorporate the use of digital knock detection devices. The first device performs frequency domain analysis on the time history of the vibration sensor wave pattern. The frequency analysis is utilized to determine a multi-spectrum knock index that is used to compensate for background noise. The multi-spectrum knock index is based upon a set of equations using weighted averaging of previous frequency peak values when knock does not occur. Unfortunately, this approach appears to be susceptible to false alarms produced by spurious engine noises such as valve closings and piston slaps which generate harmonics in the same frequency range as a knock event. This device is more fully described in the Society of Automotive Engineers Publication No. SAE 920702 entitled *Engine Knock Detection Using Multi-Spectrum Method* by M. Kaneyasu et al., reprinted from Sensors and Actuators 1992 (SP-903), February, 1992.

The second approach to knock detection and control utilizes a narrowband sensor with the detection signal processed over the window of from (10 to 90) crankshaft degrees after top dead center (ATDC). A gain constant K, which characterizes the knock detection threshold, is calculated based upon breakpoints in cumulative probability curves, relative to a logarithmic scale for the peak detector output. However, the data presented does not indicate how resistant this second approach is to engine noise sources at high RPM. This device is more fully described in the Society of Automotive Engineers Publication No. SAE 891964 entitled *A New Method to Automatically Optimize the Knock Detection Level in the Knock Control System* by T. Iwata et al., September, 1989.

The third approach features a knock detection strategy which includes wideband filtering, window energy estimation and standard deviation analysis. This approach uses signal energy from a sliding window but does not compensate quickly to changes in the engine noise floor due to valve closings, piston slaps or other interference sources. This approach is more fully described in the Society of Automotive Engineers Publication No. SAE 910858 entitled *Different Methods of Knock Detection and Knock Control* by K. Schmillen et al., reprinted from Sensors and Actuators 1991 (P-242), February, 1991.

Thus, there is a need in the art for improvements in digital knock detectors for spark ignition systems which control the ignition timing on an individual cylinder basis and are not susceptible to spurious noises at high engine RPMs resulting in unnecessary ignition timing adjustments.

SUMMARY OF THE INVENTION

The need in the art is addressed by the digital knock detector for spark ignition systems and method of the present invention. The invention includes a first mechanism for sensing engine noise during a first time period of an engine combustion cycle and providing a first signal in response thereto. A second mechanism is also provided for sensing engine noise and engine knock during a second time period of the combustion cycle and providing a second signal in response thereto. Finally, a third mechanism is included for comparing the first and second signals and generating a third signal to determine the occurrence of an engine knock.

In a preferred embodiment, a vibration signal represented by an electrical voltage is bandpass amplified, digitized and filtered by a tunable filter. The filtered digital signal, which represents engine vibrations, is then directed to first and second energy detectors. The coefficients of the tunable filter and the timing signals of the energy detectors are provided by a programmable memory. Each energy detector respectively provides an energy signal which represents the total energy within one of two separate regions within a single combustion cycle. The two separate regions represent a no-knock time duration and a knock time duration of the combustion cycle. The two energy signals are then subjected to a hypothesis test within a comparator to determine the occurrence of an engine knock.

DESCRIPTION OF THE INVENTION

Figure 1:
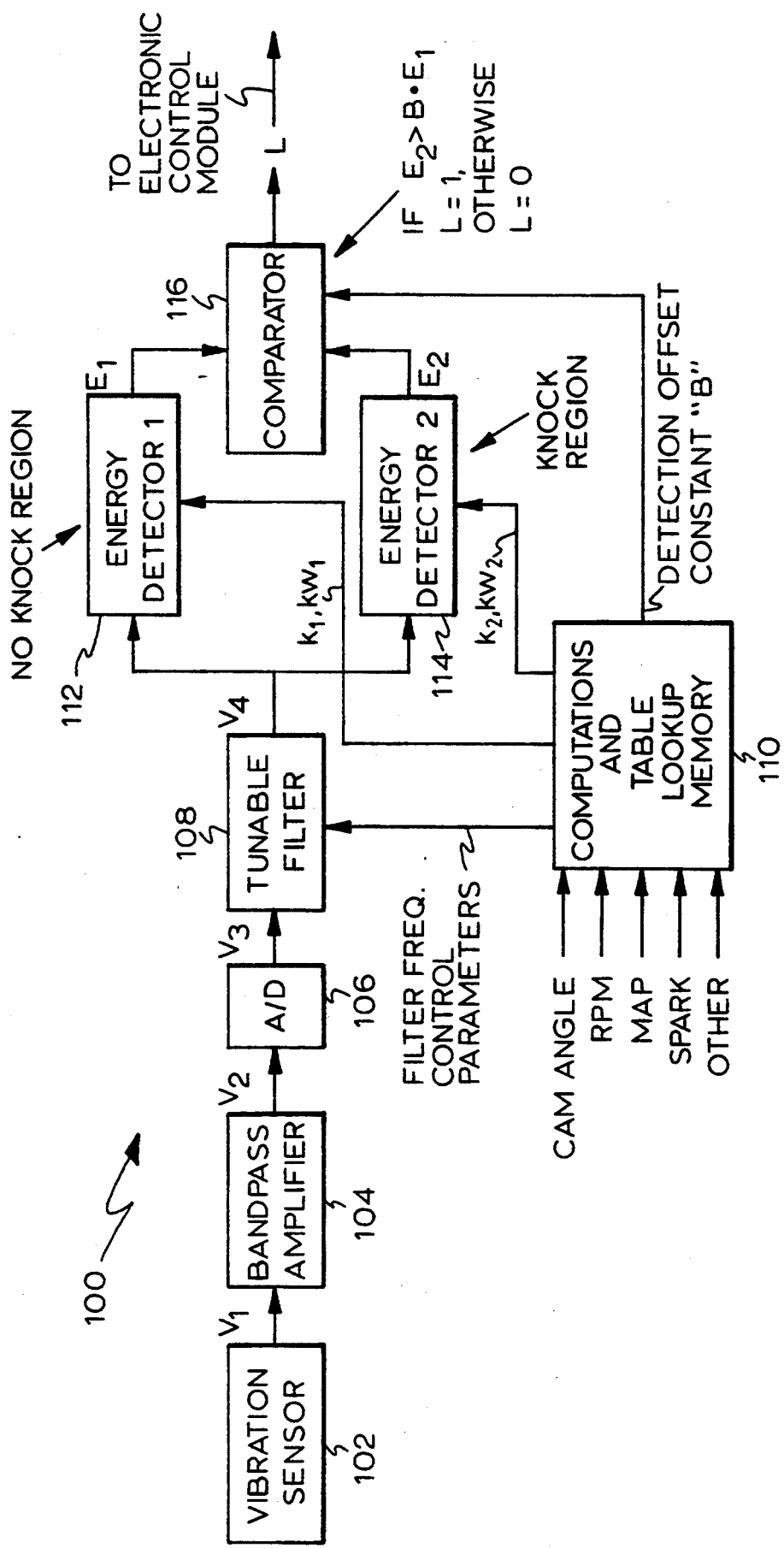
FIG. 1 is a simplified block diagram of an illustrative embodiment of the digital knock detector of the present invention showing first and second energy detectors and a comparator for determining the occurrence of a knock event.

The invention is a digital knock detector 100 for use in internal combustion engines as shown in FIG. 1. The knock detector 100 is employed for detecting knock phenomenon that occurs during the combustion cycle of an engine (not shown) and is generally located within the engine compartment mounted on an integrated circuit chip. The spurious noises (e.g., engine noise floor energy) and knock noises experienced by the engine are monitored by a vibration sensor 102. The vibration sensor 102 is mounted on the engine, for example, at the cylinder head and serves as a transducer by converting mechanical vibrations to an electrical voltage signal $V_1$. Signal $V_1$ is a continuous time signal that is generated when the engine ignition is energized. The available bandwidth of the signal is up to approximately 25 kHz.

A bandpass amplifier 104 is in communication with the vibration sensor 102 and receives the signal $V_1$ therefrom. The bandpass amplifier 104 serves as a filter which amplifies and passes acoustic frequencies within the range of (4-12) kHz. However, this frequency range is dependent upon the engine type employed. The very low and very high frequencies are thus eliminated which serves to minimize erroneously perceived knock events (e.g., false alarms). Signal $V_1$ is amplified and bandpass filtered resulting in the continuous time signal $V_2$ as shown in FIG. 1. Connected to the bandpass amplifier 104 is an analog-to-digital (A/D) converter 106. Although the continuous time signal $V_2$ could be processed as an analog signal, the signal $V_2$ is converted to a time sampled digital signal $V_3$ by the A/D converter 106 operating at approximately 50 kHz. Use of a digital processing system provides the advantage of consistency of performance over the analog counterpart.

The time sampled digital signal $V_3$ is then transmitted to and processed by a tunable digital filter 108. The tunable filter 108 has variable filter coefficients which are determined by a computations and table lookup memory 110 shown in FIG. 1. The tunable filter 108 provides a digital filtered signal (e.g., a digital voltage) $V_4$ that exhibits a narrower band of acoustic frequencies. The digital filtered signal $V_4$ is hereafter referred to as $V_4(k)$ where k is an index incremented at $\tau$ second intervals. The sample period, $\tau$, measured in milliseconds is then $$\tau = 1/(50 \text{ Khz}) \quad [1]$$

which is based on the operating frequency of the A/D converter 106. An equivalent description of the time sampling rate is an angular sampling rate. The angular sampling rate is measured in $\alpha$ degree intervals where $$\alpha = 6\tau \text{RPM} \quad [2]$$

degrees per sampling interval and where $\tau$ is time in second intervals and RPM is equal to the rotational speed of the engine. The filtered digital signal $V_4(k)$ is then directed to a first energy detector 112 and to a second energy detector 114 as described herein below.

The computations and lookup table memory 110 is a programmable memory which can be, for example, a read-only memory (ROM) that is formed on the integrated circuit chip of the digital knock detector 100.

The computations and lookup memory 110 provide storage for tabular values utilized by other components of the digital knock detector 100. A plurality of engine parameters are received by the computations and lookup table memory 110 from other engine sensors as indicated in FIG. 1. Examples of the received engine parameters include cam shaft angle, engine RPM, manifold absolute pressure (MAP) which is a measure of engine vacuum, spark advance timing relative to top-dead-center (TDC) and other miscellaneous measurements. Some examples of the other miscellaneous measurements can include engine temperature, ambient temperature, fuel octane rating and the like.

The computations and lookup memory 110 provides a plurality of output signals used to enable other components of the knock detector 100 to detect a knock event. A first output signal includes the filter frequency control parameters (e.g., the variable filter coefficients) for the tunable filter 108 shown in FIG. 1. The number of frequency control parameters provided is dependent upon the type of tunable filter employed. The filter frequency control parameters establish the characteristics of the tunable filter 108 which provides the filtered digital signal $V_4(k)$.

The next set of output signals provided by the computations and table lookup memory 110 include the energy detection timing signals. The energy detection timing signals, which comprise ($k_1$, $kw_1$ and $k_2$, $kw_2$), are transmitted to the first and second energy detectors 112 and 114, respectively. In particular, $k_1$ and $k_2$ represent the starting indexes in the lower limit of the energy summation of the digitized signal $V_4(k)$ of the first and second energy detectors 112 and 114, respectively. Likewise, $kw_1$ and $kw_2$ represent the width (e.g., the number of time samples) in the respective energy detector windows or regions appearing in the upper limit of the energy summation measured by the first and second energy detectors 112 and 114, respectively. Thus, the lower and upper limits of the summation of the total energy existing in the respective energy detector windows or regions are provided by the computations and table lookup memory 110.

The final output signal provided by the computations and table lookup memory 110 is the detection offset constant B. The detection offset constant B can be stored or calculated on the integrated circuit chip and thereafter transmitted to a digital comparator 116 shown in FIG. 1. In the digital comparator 116, the detection offset constant B is utilized to establish a threshold energy level to distinguish between a knock and a no-knock event as discussed in more detail hereinbelow.

In the preferred embodiment, the first and second energy detectors 112 and 114 can be implemented as a digital signal processor on the integrated circuit chip as is known in the art. This miniature construction provides a space economy advantage over an analog implementation comprised of discrete circuitry such as amplifiers, capacitors and resistors. In defining the function of the first and second energy detectors 112 and 114, respectively, it is helpful to consider the following scenario. Assume that a six cylinder gasoline engine (not shown) has a firing order of 1-6-5-4-3-2 and that a cylinder fires every 120° of crankshaft rotation. For any given cylinder, spark ignition occurs at time $t_s$ seconds or $d_s$ degrees before top-dead-center (TDC) of the crankshaft. Each cylinder is treated independently. Assume that for any given cylinder, the index k of the digital signal $V_4(k)$ goes from 0 to N where k=0 corresponds to $t_s$ seconds or $d_s$ degrees before TDC and k=N corresponds to 120° after TDC.

Figure 2:
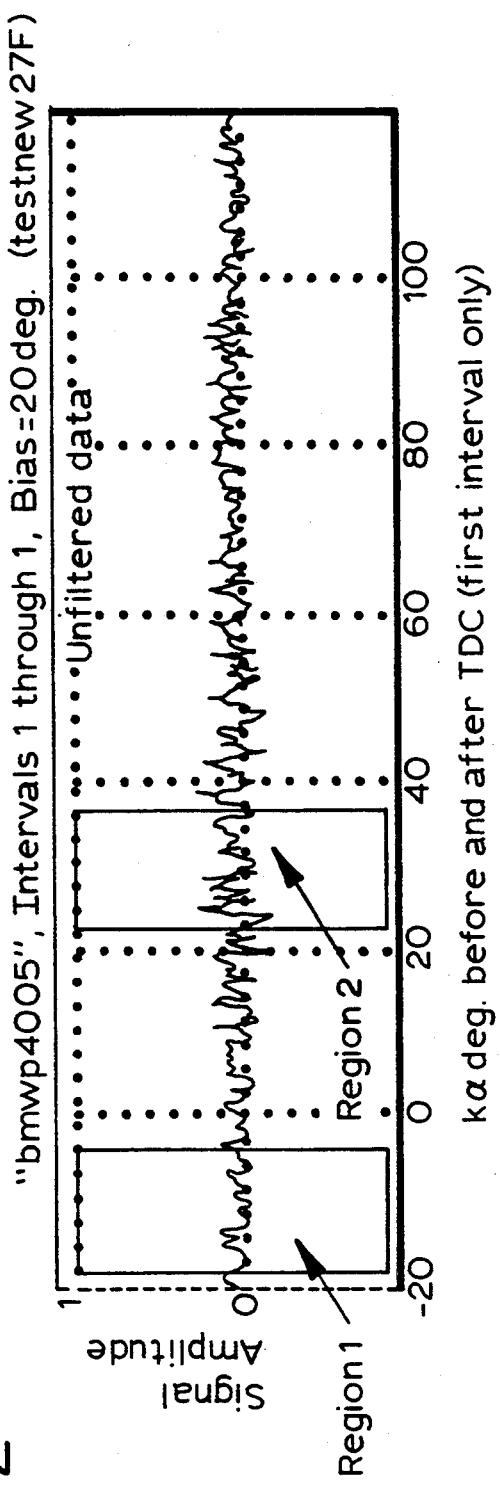
FIG. 2 is a graph showing signal amplitude versus degree measurement before and after TDC for energy detector regions 1 and 2 of a no-knock event associated with the engine knock detector of FIG. 1.
Figure 3:
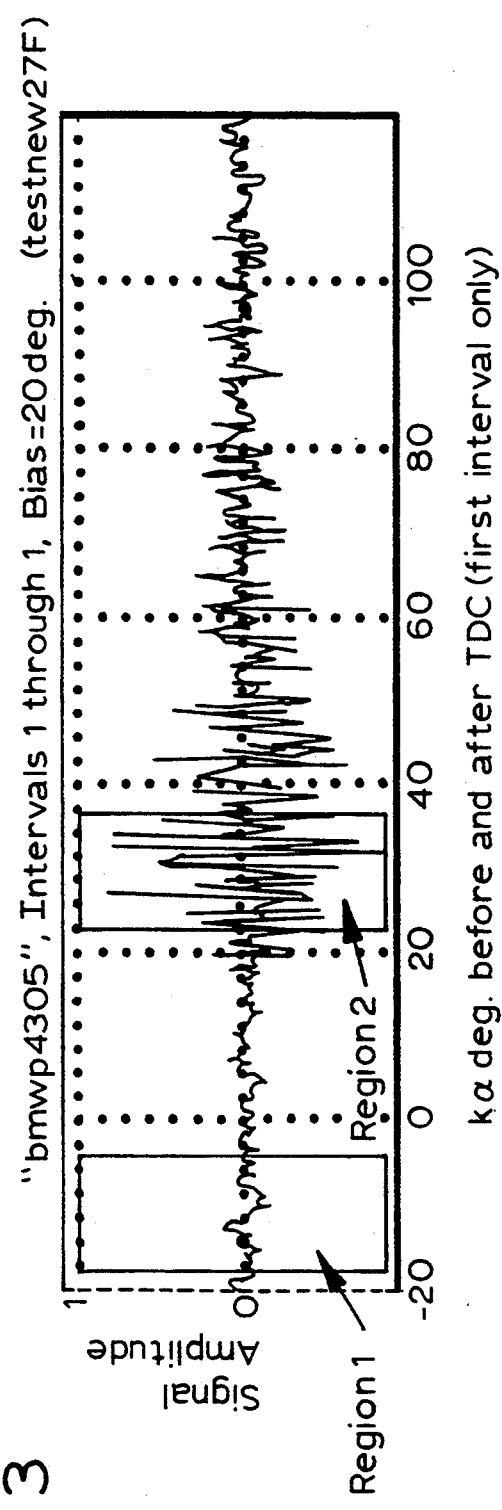
FIG. 3 is a graph showing signal amplitude versus degree measurement before and after TDC for energy detector regions 1 and 2 of a knock event associated with the engine knock detector of FIG. 1.

The unfiltered digital voltage $V_3$ at the output terminal of the A/D converter 106 shown in FIG. 1 can be represented by $V_3(k\alpha)$ where $k\alpha$ is the number of degrees before or after TDC. Representative graphs of $V_3(k\alpha)$ plotting signal amplitude versus degrees measurement before and after TDC are shown in FIGS. 2 and 3. The graph of FIG. 2 represents a no-knock event while the graph of FIG. 3 represents a knock event. Each of the graphs in FIGS. 2 and 3 shows energy detector regions 1 and 2. In both FIGS. 2 and 3, energy detector region 1 represents a no-knock time duration positioned from approximately −20° to −5° while energy detector region 2 represents a knock time duration positioned from approximately 22° to 37°. A no-knock time duration region is a region located ahead of or within the combustion cycle in which an engine knock is unlikely to occur. Likewise, a knock time duration region is a region located within the combustion cycle in which an engine knock is likely to occur. The location of the no-knock and knock regions within the combustion cycle is dependent upon empirical data including engine type and operational parameters and is determined by the energy detector timing signals provided by the computations and table lookup memory 110.

The actual unfiltered digitized data presented in FIGS. 2 and 3 is from the six cylinder gasoline engine of the scenario considered above. The unfiltered digitized data were recorded under both no-knock and knock conditions. In FIG. 2, the digital signal $V_3(k\alpha)$ in the knock time duration region 2 is similar to that in the no-knock time duration region 1. The signal is quiet and thus an engine knock does not occur. This is referred to as a no-knock event. In FIG. 3, the digital signal $V_3(k\alpha)$ in the knock time duration region 2 is characterized by high amplitude and is significantly larger than the signal amplitude in the no-knock time duration region 1. The data indicates that an engine knock has occurred. This is referred to as a knock event and is distinguishable from the no-knock event.

The digital knock detector 100 of the present invention distinguishes between no-knock and knock events by measuring the energy contained in the no-knock time duration region 1 and the energy contained in the knock time duration region 2. The two energies are then subjected to a hypothesis test to determine if an engine knock has occurred. The energy contained in the no-knock time duration region 1 in both FIGS. 2 and 3 is measured by the first energy detector 112 shown in FIG. 1. Likewise, the energy contained in the knock time duration region 2 in both FIGS. 2 and 3 is measured by the second energy detector 114 shown in FIG. 1. The energy summation over the no-knock time duration region 1 is represented by the output signal $E_1$ of the first energy detector 112 as $$E_1 = \sum_{k=k_1}^{k_1+kw_1} V_4^2(k) \quad [3]$$

The energy summation over the knock time duration region 2 is represented by the output signal $E_2$ of the second energy detector 114 as $$E_2 = \sum_{k=k_2}^{k_2+kw_2} V_4^2(k) \quad [4]$$

The output signals $E_1$ and $E_2$ are digital energy levels, e.g., a bit stream, which represent a summation of digital signals across the knock interval. The summation of the squared voltages represent the total energy within the interval. Equations [3] and [4] can be executed by the first and second energy detectors 112 and 114, respectively, which are implemented as a digital signal processor in the preferred embodiment. The digital signal processor includes a built-in accumulator suitable for summing over specified limits. The limits appearing in equations [3] and [4] define the area over which the summation of energy is taken. The limits are the energy detection timing signals ($k_1$, $kw_1$ and $k_2$, $kw_2$) provided to the first and second energy detectors 112 and 114, respectively, by the computations and table lookup memory 110.

The output signals $E_1$ and $E_2$ of the first and second energy detectors 112 and 114, respectively, are transmitted to the comparator 116. Simultaneously, the detection offset constant B is transmitted to the comparator 116. The constant B is utilized to establish a threshold energy level for the hypothesis test applied by the comparator 116 to distinguish between a knock and a no-knock event. The constant B can be calculated on the integrated circuit chip and is dependent upon variables including the type of engine, engine RPM, MAP and other engine parameters. Further, the constant B can be an integer or a fraction. The hypothesis test which is employed for random phenomena testing and applied by the comparator 116 to distinguish a knock event from a no-knock event is given by $$\text{If } E_2 > B \cdot E_1 \quad [5]$$

then a knock event has occurred and a logical output signal (L) of the comparator 116 is equal to a logical one, e.g., L=1. This condition defines a knock event. If the inequality expressed in equation [5] is not true, then a knock event has not occurred and the output signal of the comparator 116 is equal to zero, e.g., L=0. This condition defines a no-knock event. The inequality expressed in equation [5] can be implemented in software to compare the two digital signals $E_1$ and $E_2$ as is known in the art. A determination is made that a knock event has occurred when the inequality expressed in equation [5] is true because the energy in the knock time interval region 2 has increased. Knock time interval region 2 is the interval in the combustion cycle in which engine knock is most likely to occur. The magnitude of the difference $E_2 - E_1$ can be utilized to control the degree of spark retard necessary to prevent engine knock on the following engine cycle.

The hypothesis test is continuously applied by the comparator 116 to distinguish between knock and no-knock events. The logical output signal "L" of the comparator 116 is directed to an electronic control module (not shown) of an internal combustion engine. The electronic control module controls the engine parameters such as, for example, spark ignition timing, fuel/air mixture and the like. The absolute value of the logical output signal L determines the operation of the electronic control module. For example, a particular logical output signal might require an adjustment to the spark ignition timing to compensate for a knock event.

In operation, the digital knock detector 100 of the present invention senses vibration on the engine cylinder head or block and converts the vibration to an electrical signal $V_1$. The signal $V_1$ is bandpass amplified by amplifier 104 to limit the signal $V_2$ to an acoustic frequency range of approximately (4–12) kHz. The signal $V_2$ is digitized by the A/D converter 106 to provide digital signal $V_3$ and then filtered by filter 108 to provide signal $V_4(k)$. The filter coefficients for the filter 108 and the energy detection timing signals ($k_1$, $kw_1$ and $k_2$, $kw_2$) are provided by the computations and table lookup memory 110. The digital signal $V_4(k)$ and the energy detection timing signals are directed to the appropriate energy detector 112 or 114, respectively. The energy detectors 112 and 114 measure the energy in the no-knock time duration region 1 and the knock time duration region 2, respectively, of the combustion cycle using equations [3] and [4]. The energy measurement signals $E_1$ and $E_2$ are each transmitted to the digital comparator 116 for comparison. The energy threshold level is established by the detection offset constant B and the hypothesis test is applied to the signals $E_1$ and $E_2$ using equation [5]. The logical output signal "L", which is indicative of a knock or no-knock event, is thereafter transmitted to the electronic control module for modifying the engine parameters as necessary.

The partitioning of the sensor signals into regions, the calculation of the energies of the relative regions and the use of engine operating conditions to set filter coefficients, delays between time duration regions 1 and 2, and the region widths are significant factors in the performance of the digital knock detector 100 of the present invention. The present invention permits distinguishing between knock and no-knock vibration signature patterns by measuring the energy of the digitized vibration signal in two windowed regions of the combustion cycle in the time domain. Utilization of a hypothesis test ensures the identification of a knock event. Additionally, the present invention continuously adapts to the changes in engine noise floor energy from all sources. The identification of the vibration signature patterns is accomplished on an individual engine cylinder basis thereby allowing individual cylinder knock detection and control. Further, the identification of vibration signal patterns, including those at inaudible knock levels, occurs without depending on averaging or statistical analysis of previous combustion events. Knock detection performance is thus improved while false alarms and missed detections are minimized.

In an analog implementation, the vibration sensor 102 would provide the signal $V_1$ to the bandpass amplifier 104. The analog voltage signal $V_2$ would then be transmitted to an analog filter to provide a signal to the first and second energy detectors 112 and 114. In the analog implementation, the energy detectors 112 and 114 would comprise discrete circuitry such as operational amplifiers, capacitors, resistors and a clock. The computations and table lookup memory 110 would comprise digital and analog hardware. Finally, the comparator 116 can be comprised of a zener diode or a silicon controlled rectifier (SCR) that triggers a multi-vibrator if the output signal exceeds a specified threshold.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such modifications, applications and embodiments within the scope of the present invention. Accordingly,

What is claimed is:

1. An engine knock detector, comprising:
   vibration sensing means for sensing engine vibration and providing a vibration sensor output signal;
   means for converting said vibration sensor output signal to a digital signal;
   band pass digital filter means for digitally filtering said digitized vibration sensor output signal with a tunable digital filter and providing a digital filter output signal, wherein said filter passes only spectral components within a tunable frequency pass band and rejects spectral components outside said tunable pass band, and wherein tunable pass band is selectable and determined by filter control parameters;
   first energy detector means responsive to said digital filter output signal for sensing engine noise during a first time period of an engine combustion cycle and providing a first signal in response thereto;
   second energy detector means responsive to said digital filter output signal for sensing engine noise during a second time period of said engine combustion cycle and providing a second signal in response thereto;
   comparing means for comparing said first and second signals and generating a third signal to determine the occurrence of an engine knock; and
   means responsive to engine operating condition parameters to set said filter control parameters.

2. The engine knock detector of claim 1 wherein said comparing means includes a comparator.

3. The engine knock detector of claim 1 further including means for amplifying said vibration sensor output signal.

4. The engine knock detector of claim 3 wherein said amplifying means comprises a bandpass amplifier.

5. The engine knock detector of claim 1 further including means for computing and storing a plurality of parameters for subsequent transmission to said first and second energy detector means.

6. The engine knock detector of claim 5 wherein said computing and storing means comprises a computations and table lookup memory.

7. The detector of claim 1 wherein said engine operating condition parameters include engine revolution speed data.

8. The detector of claim 1 wherein said engine operating condition parameters include engine cam angle data.

9. The detector of claim 1 wherein said engine operating condition parameters include engine spark advance timing data.

10. The detector of claim 1 wherein said engine operating condition parameters include engine manifold absolute pressure.

11. The detector of claim 1 wherein said first time period is a no-knock time duration region within the combustion cycle during which an engine knock is unlikely to occur, and said second time period is a knock time duration region within the combustion cycle in which an engine knock is likely to occur.

12. The detector of claim 1 wherein said engine has a plurality of cylinders, and said first energy detector means and said second energy detector means are operative to analyze said digital filter output signal for each said engine cylinder independently, and said comparing means is operable to thereby determine the occurrence of an engine knock for each cylinder.

* * * * *